(12) United States Patent
Smith

(10) Patent No.: US 7,644,946 B2
(45) Date of Patent: Jan. 12, 2010

(54) DRAWBAR SIDE CUSHIONING FOR TRACTORS

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 50 days.

(21) Appl. No.: 11/670,730

(22) Filed: Feb. 2, 2007

(65) Prior Publication Data

US 2008/0185161 A1 Aug. 7, 2008

(51) Int. Cl.
*B60D 1/32* (2006.01)
*B60D 1/50* (2006.01)
*A01B 59/00* (2006.01)

(52) U.S. Cl. .................... 280/455.1; 280/483; 172/678
(58) Field of Classification Search ................ 172/324, 172/325, 328, 447, 450, 605, 677, 827, 678; 280/438.1, 439, 440, 455, 455.1, 483, 485, 280/488, 484, 486, 479.3
See application file for complete search history.

(56) References Cited

U.S. PATENT DOCUMENTS

| 734,055 | A | * | 7/1903 | Gardner | 280/488 |
|---|---|---|---|---|---|
| 776,994 | A | * | 12/1904 | Brennan, Jr. | 280/408 |
| 1,574,072 | A | | 2/1926 | Endebrock | |
| 1,574,351 | A | | 2/1926 | Altgelt | |
| 2,127,689 | A | * | 8/1938 | Johnson | 280/484 |
| 2,678,222 | A | | 5/1954 | Payzant | |
| 2,947,551 | A | * | 8/1960 | Reimers | 280/499 |
| 3,627,060 | A | | 12/1971 | Lemmon | |
| 3,677,565 | A | * | 7/1972 | Slosiarek | 280/499 |
| 4,116,458 | A | | 9/1978 | Berg | |
| 4,281,847 | A | * | 8/1981 | Robe | 280/455.1 |
| 4,465,293 | A | * | 8/1984 | McNab et al. | 280/474 |
| 4,515,387 | A | | 5/1985 | Schuck | |
| 4,603,878 | A | * | 8/1986 | Smith, Jr. | 280/479.2 |
| 4,640,522 | A | | 2/1987 | Teich | |
| 5,201,536 | A | | 4/1993 | Bono et al. | |
| 6,250,664 | B1 | * | 6/2001 | Tetrick | 280/495 |
| 6,581,953 | B2 | * | 6/2003 | Jerry | 280/486 |
| 6,749,213 | B2 | * | 6/2004 | Kollath et al. | 280/455.1 |
| 2006/0096766 | A1 | | 5/2006 | Warlick | |

FOREIGN PATENT DOCUMENTS

| DE | 951 418 | 10/1956 |
|---|---|---|
| DE | 9208777 U | 3/1993 |
| FR | 2406532 | 5/1979 |
| GB | 2266084 | 10/1993 |

* cited by examiner

*Primary Examiner*—Thomas B Will
*Assistant Examiner*—Matthew D Troutman
(74) *Attorney, Agent, or Firm*—Patrick M. Sheldrake; John William Stader; Michael G. Harms

(57) ABSTRACT

A removable side impact load cushioning device for use on the hitch on an agricultural tractor or prime mover that allows operator selectable use of the device to dampens side impact loads on a drawbar by enabling slight lateral movement of the drawbar or to retain the drawbar in a generally laterally fixed position.

11 Claims, 5 Drawing Sheets

DRAWBAR SIDE CUSHIONING FOR TRACTORS

BACKGROUND OF THE INVENTION

The present invention relates generally to hitches for attaching towed implements to agricultural tractors and more particularly to an apparatus for reducing lateral impact loading on a tractor drawbar caused by implements being towed.

Agricultural tractors are often used to pull implements, such as wagons and carts, by connection to the tractor's drawbar. Drawbars are typically connected to a tractor using a pivotal connection that allows the hitch end of the drawbar to move through an arc. Movement of the drawbar simplifies coupling of an implement by eliminating the need to precisely align the tractor and implement relative to each other during coupling operations and thus simplifying the coupling operation. While such movement benefits the implement coupling operation, excessive movement in the drawbar connection during implement towing can lead to unintentional implement movement and even amplify trailer surge or sway movements. Controlling drawbar movement after coupling an implement has led to numerous devices for rigidly fixing the drawbar into position thereby preventing unwanted lateral movement of the drawbar.

During movement of the tractor and coupled implement, the drawbar may be subjected to impact loads in various directions. Side loading is particularly noticeable while pulling single-axle trailers, such as a grain carts. When only one wheel of a single-axle trailer contacts an obstruction the resulting force creates a moment about the center of the implement axle that is transferred as a lateral impact load to the tractor through the drawbar. Impact loads on the tractor drawbar require additional materials in the drawbar attachment structure to withstand the higher stresses and can cause discomfort to the tractor operator.

It would be a great advantage to provide a simple device to incorporate side cushions in the drawbar connection to the tractor to attenuate the lateral impact loads on the tractor. These and other advantages are provided by the draft control system described below.

SUMMARY OF THE INVENTION

Accordingly, it is an object of the present invention to provide a simple device to cushion a tractor drawbar thereby attenuating side impact loads on the drawbar.

It is a further object of the present invention to provide a side impact cushioning device for a tractor drawbar that is easily installed using removable connections.

It is a further object of the present invention to provide a side impact cushioning device for a tractor drawbar that can be installed without the need for tools.

It is a further object of the present invention to provide a side cushioning device for a tractor drawbar that includes provisions to prevent damage to the cushioning material in the event of severe lateral loading on the drawbar.

It is a still further object of the present invention to provide a side cushioning device for a tractor drawbar that may be aligned in a manner to prevent lateral deflection of the tractor drawbar as would be useful when using auto-guidance systems to control implement coverage of a field.

It is a still further object of the present invention to provide a side cushioning device for a tractor drawbar that attenuates lateral impact loads on the tractor thereby reducing operator fatigue and increasing productivity.

It is a still further object of the present invention to provide a side cushioning device for a tractor drawbar that attenuates lateral impact loads on the drawbar thereby reducing the structural load requirements on the drawbar and drawbar connection to the tractor.

It is a still further object of the present invention to provide a side impact load cushioning device for an agricultural tractor drawbar that is durable in construction, inexpensive of manufacture, carefree of maintenance, easily assembled, and simple and effective to use.

These and other objects are achieved by providing a removable side impact load cushioning device for an agricultural tractor drawbar that allows the operator to select between an installation that dampens side impact loads on the drawbar by enabling slight lateral movement and one that rigidly positions the tractor drawbar in a generally laterally fixed position.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
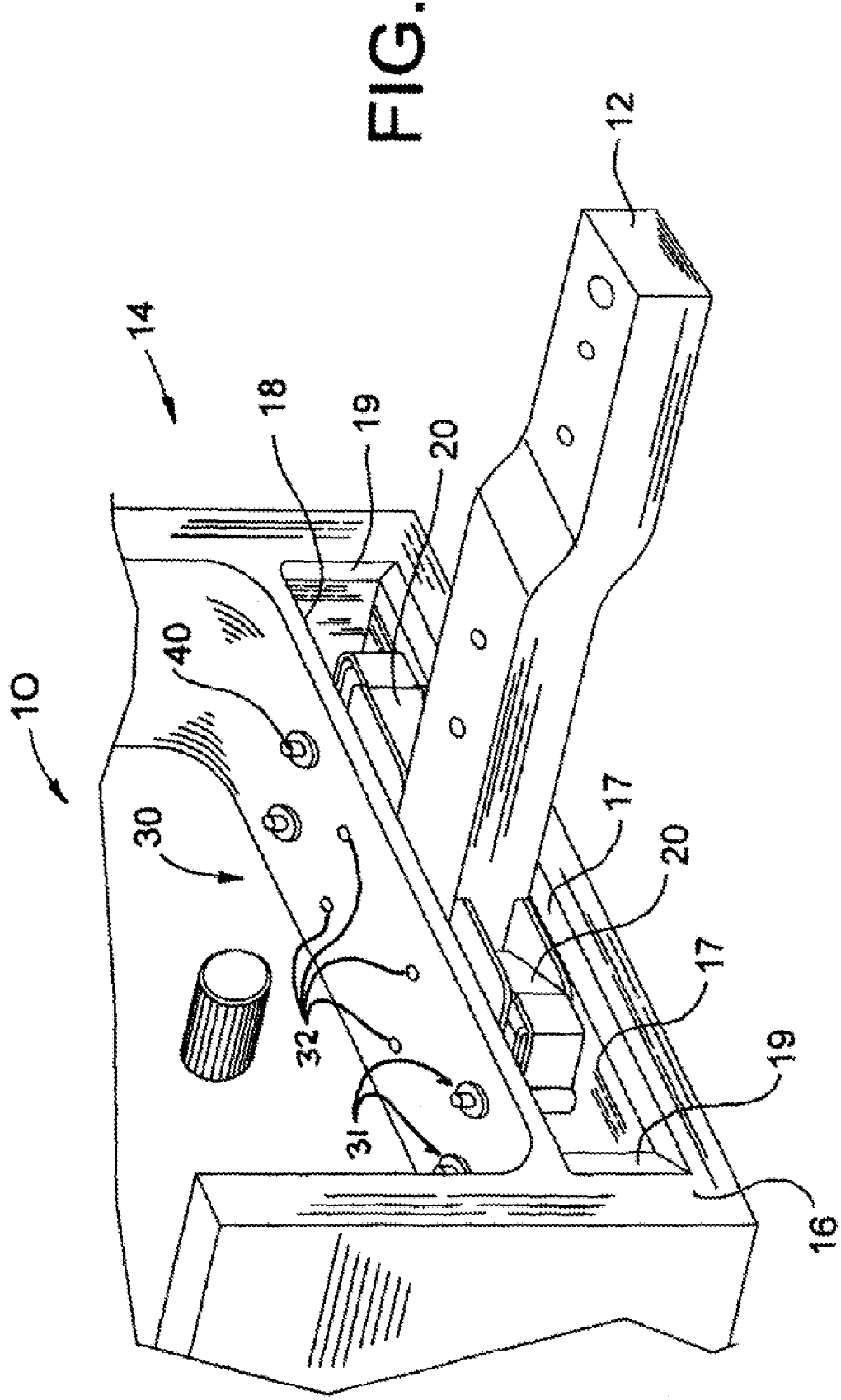
FIG. 1 is a partial rear perspective view of a tractor showing attachment of a drawbar of the type on which the present invention is useful.

Referring now to FIG. 1, there is illustrated the rear of an agricultural tractor 10 having drawbar 12 supported by a drawbar hanger 14 for coupling to and pulling an implement. Drawbar 12 is typically pivotally connected to the tractor near its forwardmost end thereby allowing the rearward most end to move laterally. Such movement facilitates coupling an implement to the tractor in that precise alignment of the tractor and implement are not necessary to couple the two; moving the drawbar compensates for any misalignment. The rearward end of drawbar 12 includes provisions for coupling an implement, such as holes for pins or for mounting coupling devices. Drawbar 12 is allowed to move laterally with respect to the tractor within the limits of movement controlled by guide structure 16. Guide structure 16 is a generally horizontally oriented slot-like opening in drawbar hanger 14 which supports the drawbar 12 from below using lower guide 17 and limits upward motion using upper guide 18. Lateral movement of the drawbar is limited by side guides 19. Drawbar connections of this type are well-known in the art.

Also shown in FIG. 1 is a pair of drawbar cushion modules 20 which are positioned within the confines of the guide structure 16 of drawbar hanger 14, one module on either side of drawbar 12. Upper and lower guides 18, 17 of the guide structure also serve to maintain cushion modules 20 in an assembled configuration by preventing upward/downward movement of the components of the cushion module, described below. The drawbar hanger 14 includes a series of attachment structures 30, or mounting holes, through which retention pins 40 may be inserted. Mounting holes 30 are provided on both the upper guide 18 and the lower guide 17. Mounting holes 30 on the upper and lower guides are aligned so that a single retention pin 40 may be inserted through both guides, engaging a hole in the upper guide and a mating hole in the lower guide, resulting in a generally vertical orientation of the retention pin 40. Once inserted, the retention pins 40 may be secured in place by cotter pins, spring pins, or the like to prevent the retention pins 40 from being dislodged from the mating holes 30. Multiple retention pins 40, typically two for each cushion module 20, are used to secure the cushion modules 20 in position. The knowledgeable designer may provide multiple mounting holes at pre-determined positions laterally along the upper and lower guides 18, 17, to allow cushion modules 20 to be located at various locations laterally in the guide structure 16. Such flexibility enables the operator to select a drawbar position (e.g., offset to one side or aligned with the prime mover centerline) most appropriate for the implement being towed, field conditions, or other external demands. As shown in FIG. 1, retention pins 40 are positioned in a first set of mounting holes 31 which enable cushion modules 20 to be installed in a first orientation that provides drawbar cushioning. When mounted in this manner, the cushion modules 20 allow slight lateral movement of drawbar 12 in response to applied lateral loads through compression of a cushion member. This movement attenuates the impact forces applied to the drawbar as they are transferred to the tractor or prime mover via the drawbar hanger 14 or frame thereby lessening the shock experienced by the equipment and the operator.

Figure 2:
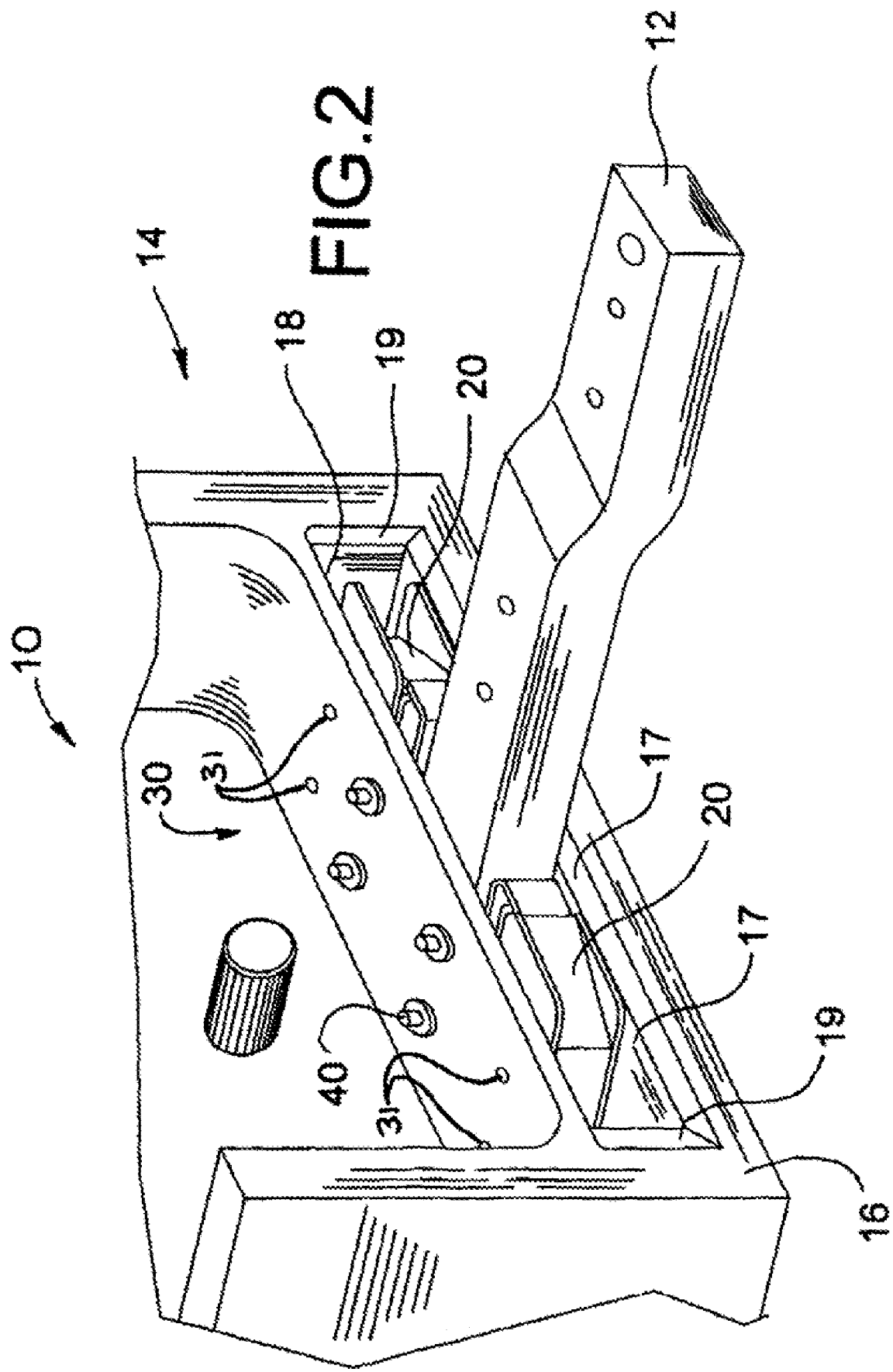
FIG. 2 is a partial rear perspective view of a tractor showing attachment of a drawbar of the type on which the present invention is useful and wherein the invention is shown in a first alternate configuration.

Referring now to FIG. 2, drawbar cushion modules 20 are shown in a second orientation relative to the first orientation shown in FIG. 1. In this second orientation, the movable portion of cushion modules 20 faces away from drawbar 12 and the retention pins 40 are adjacent to the drawbar 12. The retention pins 40 retain drawbar 12 in a generally fixed position, that is, substantially no lateral movement is allowed. A second set of mounting holes 32 are provided in the upper and lower guides to position the reoriented cushion modules 20 to restrain the drawbar 12. Other mounting holes may be provided to enable the cushion modules 20 to function as travel stops for drawbar motion In the guide structure 16 or to position the drawbar In various predetermined lateral positions as deemed appropriate by the operator.

Figure 3:
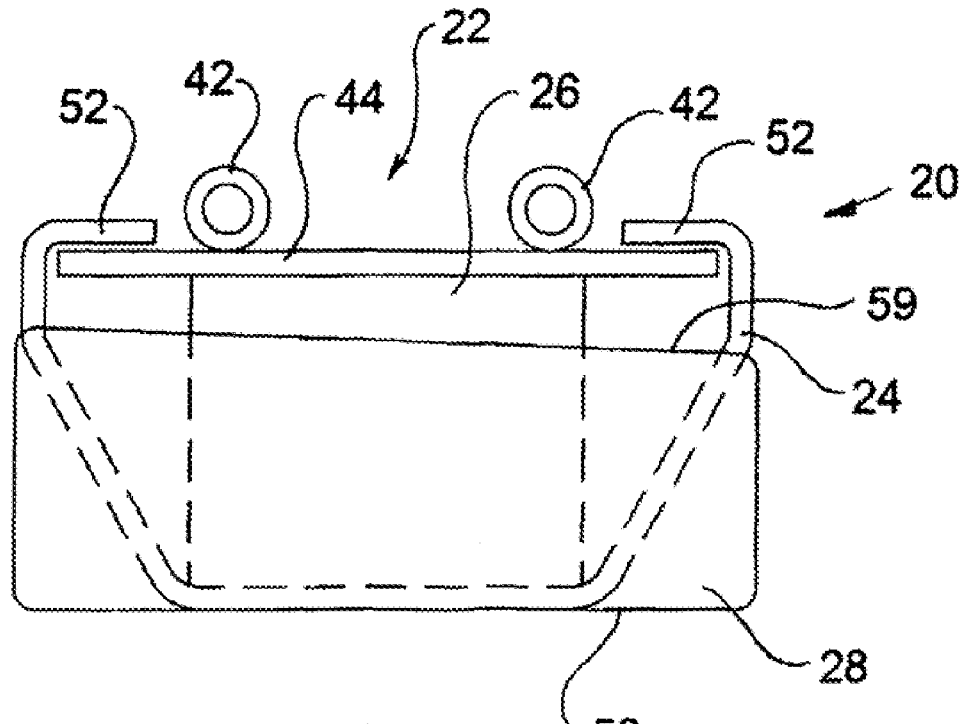
FIG. 3 shows the relationship of the pinned and impact members of the cushion module when in the uncompressed condition.
Figure 4:
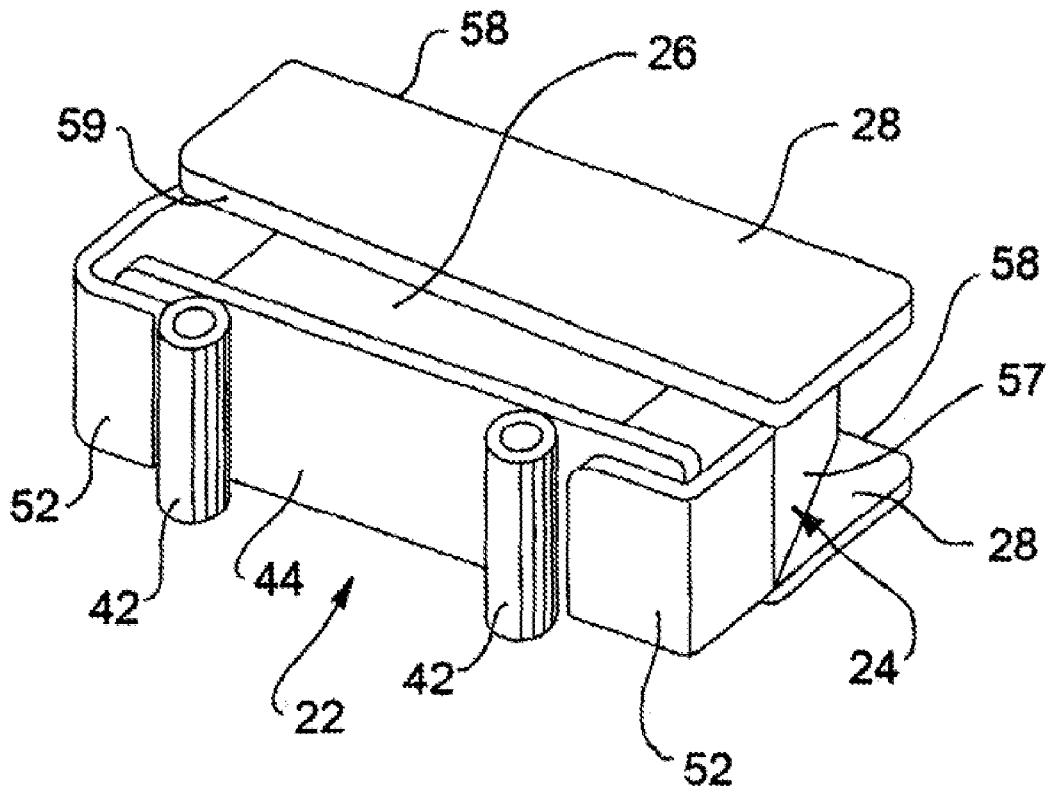
FIG. 4 is an isometric view of the cushion module showing the pinned and impact members with the cushion member in the uncompressed condition.

FIGS. 3 and 4 show a cushion module 20 comprising a pinned member 22, an impact member 24, a cushion member 26, and a pair of travel limiter members 28. Pinned member 22 comprises a generally planar base 44 and preferably two pin connection structures 42 connected to the base 44 that receive the pins 40 which secure pinned member 22 to guide structure 16. Those skilled in the art will recognize that numerous alternate arrangements of pin connections will provide the required torque-resistant connection and are thus contemplated within the scope of this invention. Impact member 24 is generally shaped to encircle the cushion member 26 and form a pair of retention tabs 52 that engage the base 44 to limit the movement of the impact member 24 away from the pinned member 22; the retention tabs 52 prevent the impact member and the pinned member of the cushion module from separating completely as the tabs interlock with the base 44. Other shapes are recognized as providing similar functionality and thus contemplated by this disclosure. The design of impact member 24 also enables the cushion module assembled without the need for special tools.

Travel limiter members 28 are generally planar members that are generally perpendicularly connected to impact member 24. These members 28 limit the movement of impact member 24 toward pinned member 22, defining the range of compressing movement for the cushion module. Preferably, a pair of travel limiter members 28 are used, positioned on opposing edges of the impact member 24, each travel limiter member being rigidly connected to the impact member 24, typically by welding. An impact edge 58 of travel limiter members 28 is aligned in a common plane with impact face 57 of the impact member 24 in this embodiment. When installed, drawbar 12 contacts the impact face 57 of impact member 24 and the impact edge 58 of travel limiter members 28 simultaneously; further movement compresses the cushion module 20 by moving the impact member 24 toward pinned member 22. This movement is limited by limit edge 59 which contacts base 44. Limiting the compression movement of the cushion module 20 prevents damage to cushion member 26 that could result from over compressing the member. Under normal operating conditions, impact loads will not compress a cushion member 26 of a properly specified resiliency to the extent where the travel limiter members 28 become engaged. The main purpose of the travel limiter members is to protect the cushion members 26 from damage in extreme loading situation, such as when turning while towing a high draft load implement.

Travel limiters 28 also function to retain cushion member 26 in position as module 20 is compressed. When module 20 is fully compressed, as described above, travel limiters 28, impact member 24 and base 44 enclose the cushion member 26 thereby preventing the member 26 from being discharged from the module.

Cushion member 26 is disposed between pinned member 22 and impact member 24. Member 26 may be secured to the base 44 of pinned member 22 or may be simply positioned adjacent to base 44 as the design of the cushion module 20 is such that cushion member 26 is retained in position without the use of adhesives or other similar attachment means. In the preferred embodiment, cushion member 26 is made from a resilient material, preferably an elastomer such as urethane, and shaped to fit within the cavity formed by base 44, impact member 24: and travel limiter members 28. Cushion member 26 may be formed from any compressibly elastic material or other functionally equivalent device which provides an increasing resistance force in response to compression along an axis and then returns to its original form when the compressing force is removed. As installed in the cushion module 20, cushion member 26 exerts a slight force acting on pinned member 22 and impact member 24 by being slightly compressed when installed that tends to move the members apart. This separating movement is restrained by retention tabs 52 which prevent unrestrained separation and hold the members in position against the force of the cushion member. In an unloaded (uncompressed) state the force exerted by cushion member 26 will be slight and should not preclude assembling the cushion module by hand without need of special tools.

In a simplified alternate embodiment of the invention, cushion member 26 may be attached directly to base 44 while omitting impact member 24 and travel limiter members 28. In this embodiment, drawbar 12 interacts directly with cushion member 26. Travel limiting provisions provided in the preferred embodiment may also be likewise omitted from this embodiment. This embodiment is not ideally suited for larger prime movers where the potential for larger impact and turning loads is greater in that the lack of an impact member could lead to premature wear of the cushion member 26. However, material selection, anticipated loads, or incorporation of other design features would allow this alternative to be used at significantly reduced production costs in applications where expected lateral loads on the drawbar are smaller. An additional alternative includes an enhancement to add a wear surface, such as a metallic plate, secured to the face of cushion member 26 where it interacts with drawbar 12, to limit wear on the cushion member itself.

Figure 5:
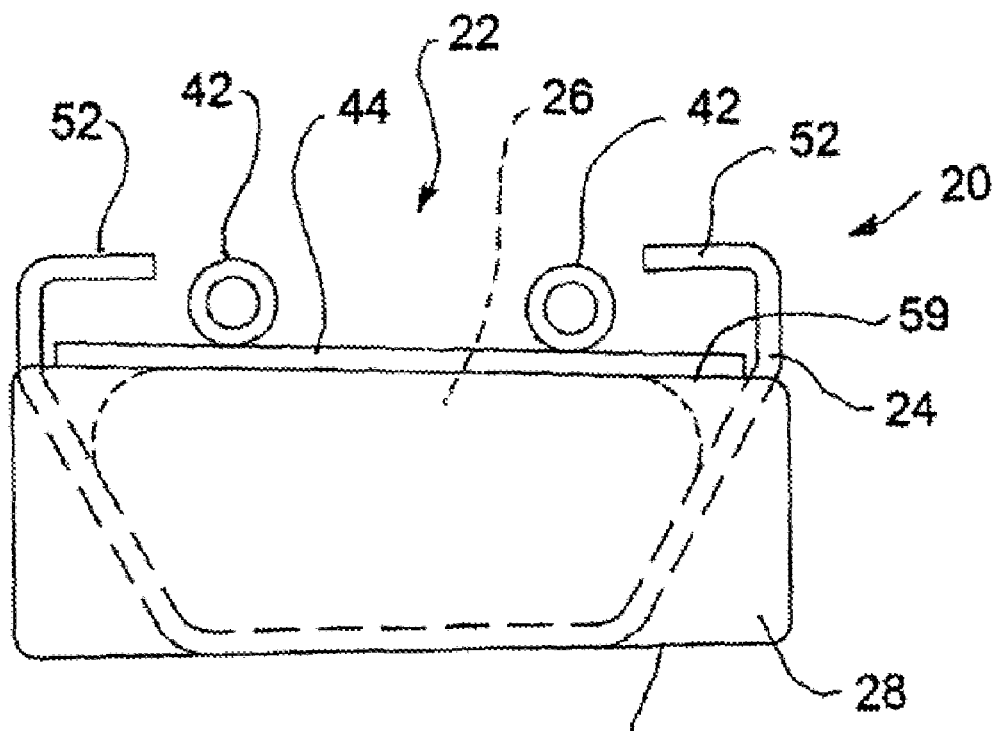
FIG. 5 shows the relationship of the pinned and impact members of the cushion module when in the compressed condition.
Figure 6:
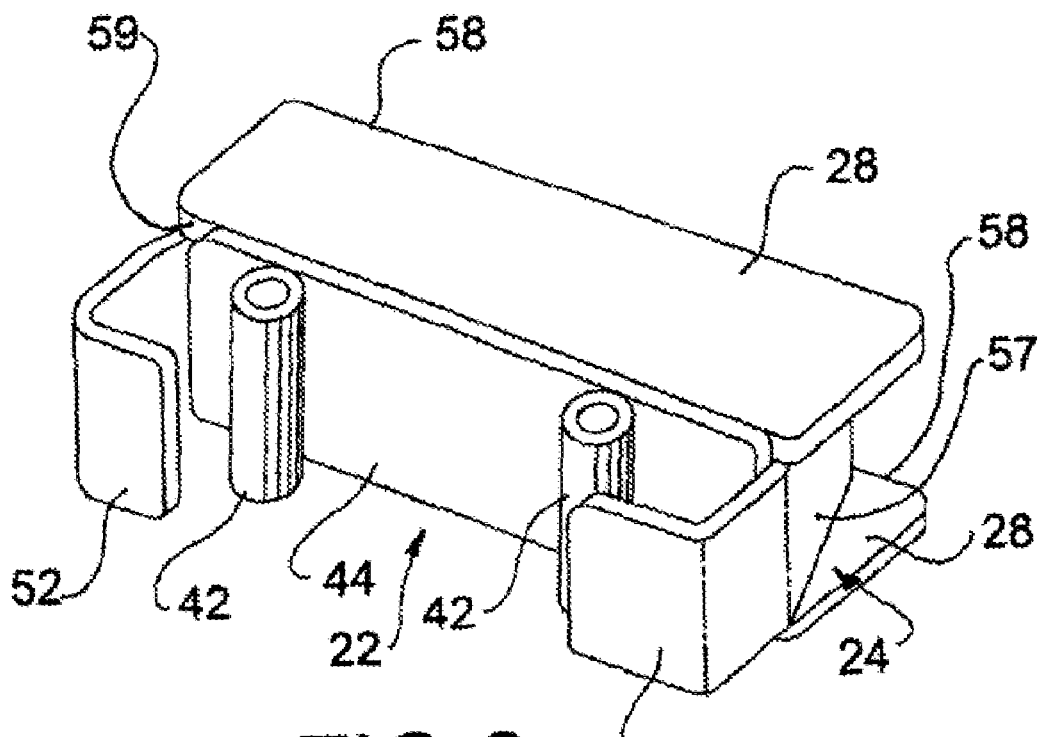
FIG. 6 is an isometric view of the cushion module showing the pinned and impact members with the cushion member in the compressed condition and FIG. 7 shows an alternate cushion member that may be used in the cushion module.

Now referring to FIGS. 5 and 6, cushion module 20 is shown with cushion member 26 in the compressed position as would be experienced when installed and a drawbar side load is applied. As the drawbar exerts a load on the cushion module 20, impact member 24 is moved toward pinned member 22 until the limit edge 59 of travel limiter member 28 contacts base 44. Once the cushion module is compressed to the position as shown in FIGS. 5 and 6, no further compression will be allowed. Limiting the compression of cushion member 26 prevents damage that could result from over-compressing the member.

Figure 7:
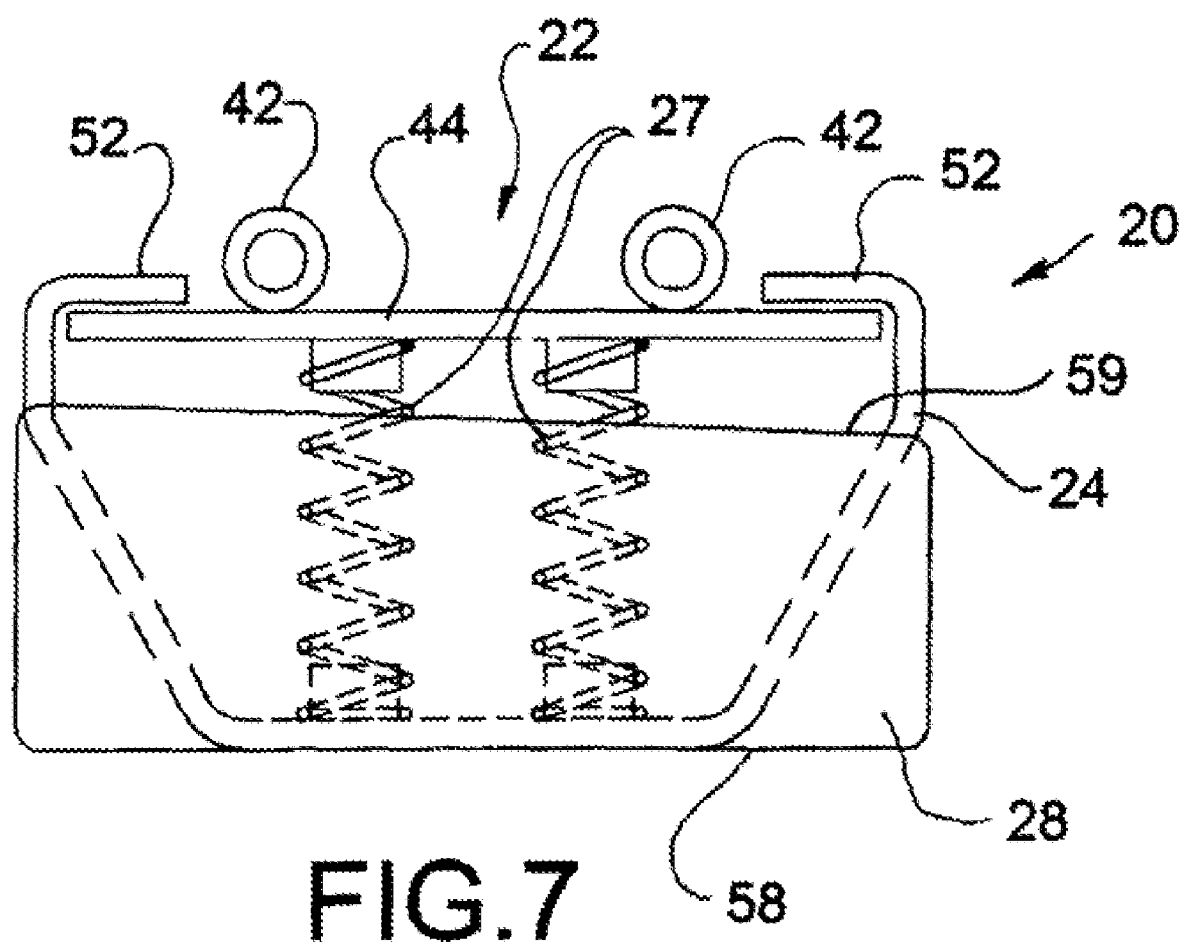

FIG. 7 shows an alternate embodiment of the cushion module 20 in which the elastomeric cushion module as previously shown is replaced by one or more compression springs 27. Compression springs 27 are recognized as being generally functionally equivalent to a compressible elastomer and may be selected by the designer for cost, durability, or strength concerns. Other elastomeric materials and compression springs are contemplated as being generally functionally equivalent (refer to FIG. 7). Cushion member 26 may be formed from any material or device which provides an increasing resistance force in response to compression along an axis.

it will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention, however, concepts, as based upon the description, may be employed in other embodiments without departing from the scope of the inventions.

What is claimed is:

1. A hitch for coupling a towed-implement to a prime mover, said hitch comprising:

a drawbar having opposing first and second ends, said first end pivotally connected to and supported by the prime mover;

a hanger connectable to and supportable by the prime mover and having a laterally disposed elongate guide structure for supporting said drawbar between said first and second ends and allowing movement of said drawbar about said pivot connection;

a pair of drawbar cushion modules disposed within said guide structure on opposing sides of said drawbar, each said module having a pinned member and a connected cushion member, said pinned member having a base and a pin connection structure for receiving a removable pin also inserted into the guide structure, the pinned member selectively securing said module to said hanger, said cushion member being disposed generally adjacent said drawbar whereby limited movement of said drawbar is allowed within said guide structure through deflection of said cushion members; and each said drawbar cushion module further comprises an impact member in movable relationship with said pinned member and said cushion member, said impact member being disposed between said cushion member and said drawbar and movable relative to said pinned member by compressing said cushion member and each said impact member is configured to allow a range of deflection of said cushion member wherein at a deflection limit of the range the impact member contacts the pinned member thereby preventing damage to said cushion member.

2. The drawbar of claim 1, wherein said cushion module is also configured for mounting in a second orientation wherein said pinned member is adjacent to said drawbar and secured to said guide structure whereby lateral movement of said drawbar is substantially prevented.

3. The drawbar of claim 1, wherein said guide structure includes a first pair of attachment structures for securing said pair of cushion modules to said guide structure, said first pair of attachment structures enabling said pair of cushion modules to be positioned, one on each side of said drawbar, so that said impact member of each said cushion module is substantially contacting said drawbar on opposite sides.

4. A hitch for coupling a towed-implement to a prime mover, said hitch comprising:

a drawbar having opposing first and second ends, said first end pivotally connected to and supported by the prime mover;

a hanger connectable to and supportable by the prime mover and having a laterally disposed elongate guide structure for supporting said drawbar between said first and second ends and allowing movement of said drawbar about said pivot connection; and a pair of drawbar cushion modules disposed within said guide structure on opposing sides of said drawbar, each said module having a pinned member and a connected cushion member, said pinned member securing said module to said hanger, said cushion member being disposed generally adjacent said drawbar whereby limited movement of said drawbar is allowed within said guide structure through deflection of said cushion members ;and wherein each said drawbar cushion module further comprises an impact member in movable relationship with both said pinned member and said cushion member, said impact member being disposed between said cushion member and said drawbar and movable relative to said pinned member by compressing said cushion member;

wherein said guide structure includes a first pair of attachment structures for securing said pair of cushion modules to said guide structure, said first pair of attachment structures enabling said pair of cushion modules to be positioned, one on each side of said drawbar, so that said impact member of each said cushion module is substantially contacting said drawbar on opposite sides; and wherein said guide structure includes a second pair of attachment structures for securing said pair of cushion modules to said guide structure, said second said pair attachment structures enabling said pair of cushion modules to be positioned, one on each side of said drawbar and each said module being reoriented, so that each said pinned member is substantially contacting said drawbar on opposite sides whereby lateral movement of said drawbar is substantially prevented.

5. The drawbar of claim 4, wherein said impact member limits the deflection of said cushion member thereby preventing damage to said cushion member.

6. The module of claim 5, wherein said cushion member is a resilient material.

7. The module of claim 6, wherein said cushion member is rubber.

8. The module of claim 6, wherein said cushion member is urethane.

9. The module of claim 6, wherein said cushion member is a spring.

10. In a prime mover having a hitch for towing an implement, the hitch having a drawbar with opposing first and second ends, the first end pivotally connected to the prime mover, and a hanger with a laterally elongate guide structure connected to and supported by the prime mover, the guide structure supporting the drawbar between the first and second ends, the improvement comprising:

a plurality of attachment structures located in pre-determined positions on the elongate guide structure;

a pair of drawbar cushion modules selectively disposed within the guide structure on opposing sides of the drawbar, each said module having a pinned member and an impact member with a cushion member disposed therebetween, said cushion member being a compressibly elastic material enabling movement of said impact member relative to said pinned member, said pinned member having a base contacting the cushion member and a pin connection structure for receiving a removable pin also inserted into the guide structure, the pinned member selectively securing said module to said attachment structures, said impact member being disposed generally adjacent said drawbar whereby limited movement of said drawbar is allowed within said guide structure through deflection of said cushion members wherein the impact member is configured to allow a range of deflection of said cushion member wherein at a deflection limit of the range the impact member contacts the pinned member thereby preventing damage said cushion member.

11. The improvement of claim 10, wherein said cushion modules are configured for mounting to the guide structure in at least two orientations wherein in one orientation the cushion modules are mounted within the guide structure and secured to said plurality of attachment structures in close proximity to each side of the drawbar whereby lateral movement of said drawbar is substantially prevented.

\* \* \* \* \*